Sept. 3, 1957 F. C. CUNNINGHAM 2,805,268
METHOD AND APPARATUS FOR PRESERVING PRODUCTS OF GAS
REACTIONS AND FOR SYNTHESIS OF ACETYLENE
Filed Aug. 30, 1951 5 Sheets-Sheet 1

Fig. 1

INVENTOR.
Frederick Corson Cunningham

INVENTOR.

United States Patent Office 2,805,268
Patented Sept. 3, 1957

2,805,268
METHOD AND APPARATUS FOR PRESERVING PRODUCTS OF GAS REACTIONS AND FOR SYNTHESIS OF ACETYLENE

Frederick Corson Cunningham, New Haven, Conn.

Application August 30, 1951, Serial No. 244,408

7 Claims. (Cl. 260—679)

This invention concerns a method for cooling the products of gas reactions in the chemical process industries, and apparatus useful in practicing the method. More particularly, the invention provides the art with a more rapid quench for the products of gas reactions, including the extremely hot products of extremely fast gas reactions, than has hitherto been available.

In my new method gas reaction products are stabilized at the desired instant by conversion of their thermal energy into mechanical energy in a gas turbine of suitable design.

One advantage of my new method is that it reduces the temperature of gas reaction products more rapidly than any method heretofore known.

Another advantage of my method is that it enables stopping a reaction at more nearly the optimum instant than has heretofore been possible.

Another advantage of my extremely rapid quench is that, under certain circumstances, as will be hereinafter explained, it permits carrying out reactions at temperatures much more elevated than would otherwise be practical.

Another advantage of this new stabilization quench is that substantial quantities of power, heretofore wasted, are produced by the turbine, and so the overall power input to processes may be reduced.

Still another advantage of my quench is that it produces cooling without the necessity of introducing foreign or contaminating materials into the gases being cooled.

In my new method the desired reactants are introduced, with suitable mixing, into a suitable chamber, within which the reaction then is conducted. The reaction products are then led from the chamber through a gas turbine of suitable design, which they are made to drive. A part of their heat energy is thereby converted to mechanical work. The reaction products are thus cooled with a rapidity hitherto unknown in chemical synthesis. In addition, substantial quantities of work are obtained as by-product, whereas if cooling were carried out by ordinary means, as for example, by water quench, this work would not be recovered.

Maximum rapidity of cooling is achieved when the turbine used is of the impulse type, and the reaction products are led from the reaction chamber through a converging-diverging nozzle. Such a nozzle, which may have an expansion ratio of, for example, 20:1, partially converts the thermal, or heat energy contained in the vibrational, rotational, and random translational modes of the molecules into kinetic energy of uni-directional translation. This conversion takes place with great rapidity when the reaction products traverse the nozzle at suitable speeds. If, for example, these gaseous products leave the reaction chamber and enter the nozzle at 750 feet per second and 1580° C., the velocity of the emerging jet is about 6960 feet per second, or Mach 2.33, assuming that the nozzle efficiency is 90% of isentropic, and the static temperature of the gas is only 812° C. The time required to achieve this quench under these circumstances is only 0.00003 second, and the stabilization quench rate is $28.5 \times 10^6$ degrees centigrade per second. This jet would, if not used to do work, revert to essentially its original temperature as it slowed down. Accordingly, it is stabilized at approximately its discharge static temperature by allowing it to impinge on the blades of an impulse turbine rotor in such a way as to produce work. It will ordinarily be found necessary to employ a multiplicity of reaction chambers, nozzles, and jets, and to allow all the jets to impinge, at different points, on the blades of the rotor of the impulse turbine. The work produced by the turbine may obviously be used to advantage, in the process being carried out or elsewhere.

My new method may also be practiced using a reaction turbine rather than power nozzles and an impulse turbine. A disadvantage of using a reaction turbine in this manner is that even when maximum cooling speeds are achieved, as by conducting the reaction mostly within the turbine itself, the rate of effective cooling is less than that accomplished by the power nozzles and impulse turbine although the net temperature drop may be greater. For reacting gas systems in which undesirable changes in synthesis gas composition take place at a sufficiently low rate, however, the reaction turbine may be able to accomplish sufficiently fast cooling. When this is true, use of a reaction turbine in the reactor may be affirmatively desirable, because such a turbine has at least two advantages over an impulse turbine. First, there is less fluid friction inefficiency, together with greater net temperature drop, and so greater power recovery. Second, the necessity for multiple carburetion of the reactant gases and multiple power nozzles is eliminated. On the other hand, use of a reaction turbine presents a problem not seriously raised if an impulse turbine is used. That is, its entire interior must be capable of withstanding the temperatures at which the reaction proceeds. The impulse turbine, on the other hand, needs to withstand this temperature only at those places which are relatively inaccessible for proper cooling, namely, the buckets of the rotor stages and of the interstage stator where the temperature of the film of gas from the high velocity jet reverts to nearly the stagnation temperature because the gas in this surface film is slowed by fluid friction.

The reaction products are made to leave the reaction chamber at the desired speed by suitably adjusting the pressure at which reactants enter the chamber. In determining the desired pressure it is, of course, necessary to take into consideration the change in volume, or $\Delta V$, which tends to take place in the reaction chamber.

The residence time of the reactants in the reaction chamber is, of course, determined not only by the volumetric rate of through-put, but also by the size and length of the reaction chamber.

My new method may be used with benefit whenever it is advantageous, as a matter of reaction kinetics, to cool the products of gas-phase reactions with great rapidity. It may be desirable to achieve this quick cooling when the desired reaction products are intermediate substances formed under non-equilibrium conditions along the reaction path toward equilibrium so as to arrest the rate of further decomposition or combination to undesired products, as in the case of acetylene synthesis by the cracking of methane and other gaseous paraffinic and olefinic hydrocarbons in a manner similar to that employed by the Sachsse process, described in more detail below, or in the case of synthesis of nitric oxide by the catalytic oxidation of ammonia. Rapid cooling may also be desirable to preserve the composition of endothermic syntheses in which all reactions have gone to equilibrium at the reaction temperature and pressure and in which the equilibrium concentrations of the gases present quickly and significantly change at temperatures intermediate between the low temperatures of kinetic stability and the high temperatures of equilibrium synthesis. Examples of this type of reaction are the synthesis of nitric oxide by the thermal oxidation of nitrogen and the synthesis of magnesium by the thermal reduction of magnesium oxide with hydrogen or carbon monoxide.

Use of my new stabilization quench may also make possible altogether new chemical syntheses, such as the preparation of hydrazine by the pyrolysis of ammonia in a hydrogen flame, of hydrogen peroxide by the oxidation of hydrogen, and of carbon disulfide by the sulfur combustion of methane.

My new method may of course be used to achieve rapid cooling even if the gases to be cooled are initially at a low temperature, for example room temperature or below. It may be used to quench not only reactions activated by heat, but also reactions activated by light, electricity, or sound. It may be used with equal facility whether the gas products formed result from homogeneous or from initially heterogeneous reactions.

My new method will also be a valuable tool for fundamental research into the chemistry of fast gas reactions.

In particular, I have discovered that my new method can be used to great advantage in the manufacture of acetylene by the cracking of methane and other gaseous paraffinic and olefinic gaseous hydrocarbons, and I have discovered a new process, for such manufacture of acetylene, that takes advantage of my new method for stabilization quench. My novel method of stabilization quench, and my novel apparatus suitable for use in practicing said method, may be best described in detail in connection with my novel process for the manufacture of acetylene.

It is well known that acetylene may be synthesized in several ways. It may be generated by the reaction of calcium carbide with water, which is the classic method. It may be made by the cracking of hydrocarbon gases by processes which supply the necessary energy in a variety of ways. The arc process supplies energy (both thermal and electrical) by a hot, electric arc discharge. The Sachsse process utilizes the heat released by the combustion of part of the hydrocarbon reactant to crack the remaining fraction. The Wulff process performs the thermal cracking by heating the reactant hydrocarbons with hot refractory solids which have previously been heated by combustion of fuel gas. The Schoch process uses the energy of a relatively cool, high frequency, electric glow discharge. These processes are all summarized and evaluated by Happel and Marsel, "Chemical Industries Week," 68 (April 28, 1951).

My new process for the production of acetylene is chemically similar to the Sachsse process in that a fraction of a gaseous paraffinic or olefinic hydrocarbon reactant, such as methane, is consumed by oxidation reactions to provide the thermal energy to crack the remaining fraction to acetylene plus hydrogen. The actual chemical reactions which are involved in such pyrolytic oxidations, i. e., partial combustions with excess hydrocarbon, are exceedingly numerous and the interactions are very complex.

While, in the final analysis, pyrolysis must probably be viewed as a statistical web of elementary chemical reactions between entities whose instantaneous distribution depends upon the prevailing temperature, pressure and energy flux, empirical and thermodynamic methods must be employed at present to analyze the known data. The empirical reaction for the formation of acetylene from methane finds stoichiometric expression in the following manner:

(1)  $2CH_4 \rightarrow HC \equiv CH + 3H_2 - 91,000$ cal.

As indicated, this reaction is endothermic, and requires the addition of 91,000 calories of heat for every gram molecule, or mole of acetylene produced. This necessary heat is supplied by the reactions between a portion of the methane and oxygen, to ultimately produce carbon dioxide, water vapor, carbon monoxide, and hydrogen, with a net liberation of heat.

Acetylene decomposes to carbon and hydrogen if it is retained at the elevated temperatures which favor its formation. This decomposition may be stoichiometrically expressed as:

(2)  $C_2H_2 \rightarrow 2C_{solid} + H_2$

It is, of course, already established that acetylene may be recovered from the hot reaction gases before it all decomposes to carbon and hydrogen, i. e., that it is produced at a greater rate than it decomposes.

It is apparent that any pyrolytic oxidation process has two advantages not possessed by the carbide, arc, and Schoch processes. First, it does not require electric power as a source of energy. Second, in the oxidation of a fraction of the hydrocarbon reactant it produces carbon monoxide and hydrogen, which are valuable for use in a variety of other syntheses, as, for example, ammonia.

As will be apparent to one skilled in the art, it is important that the pyrolysis be conducted at suitable conditions of temperature and pressure. The theoretical thermodynamic considerations involved in establishing suitable conditions by calculation will also be familiar to one skilled in the art. What conditions are suitable will, of course, vary depending on what hydrocarbon is employed in the reaction, and whether air or oxygen is used to support the oxidation reactions. When methane and oxygen are the two reactants, the following theoretical considerations are relevant.

Examination of Reaction 2 shows that the decomposition of acetylene is not accompanied by any substantial change in gas volume. A change in system pressure will therefore not affect the amount, under equilibrium conditions, of acetylene decomposed. By the law of mass action, however, the rate of decomposition probably increases in proportion to an increase in system pressure.

Reaction 1, on the other hand, goes forward with an increase in volume, which means that an increase in pressure decreases the amount, at equilibrium, of acetylene formed from the reactant methane. The rate of acetylene production according to Reaction 1, however, is increased by an increase in system pressure, in accordance with the law of mass action. Increased pressure thus shifts the equilibrium expressed in Reaction 1 and its reverse reaction in the direction of decreased conversion to acetylene and at the same time increases the rate of approach to this equilibrium conversion.

Increased temperature, of course, increases chemical rates of reaction in general, and so increases the forward rates of both Reactions 1 and 2. Because Reaction 2 is exothermic, however, increased temperature decreases the amount of decomposition, at equilibrium. On the other hand, increased temperature increases the amount of equilibrium conversion to acetylene, because Reaction 1 is endothermic.

Furthermore, it has been observed experimentally that increased temperature increases the forward rate of Reaction 1 more than it increases the forward rate of Reaction 2.

On the other hand, increased pressure may increase the forward gate of Reaction 2 more than it increases the forward rate of Reaction 1. One step in the decomposition of acetylene to graphite according to Reaction 2 is probably:

(3)  $2C_2 \text{ (gas)} + M \rightarrow C_4 \text{ (gas)} + M$ in which reaction M is any third body. This third body must probably be present when two molecules of $C_2$ meet in order for $C_4$ to be produced, because so much energy is produced in the polymerization of $C_2$ to $C_4$ that unless a third body is present to absorb this energy the two molecules of $C_2$ are driven apart by it immediately. If thus a three-body collision is essential to the ultimate progress of Reaction 2, it results as a matter of reaction kinetics, that the rate of Reaction 2 is increased more by increased pressure than is the rate of Reaction 1, which involves only two-body collisions.

Since increased temperatures result in increased equilibrium conversions to acetylene as well as in rates of acetylene production increased both absolutely and in relation to rate of decomposition to carbon, it is apparent that it is desirable, extraneous considerations aside, to carry out the pyrolysis at the highest temperature possible. It is also apparent that for any particular temperature there will be an optimum pressure: i. e., a pressure at which the beneficial effects of increased rates of acetylene production most conclusively outweigh the undesirable effects of decreased equilibrium conversions to acetylene and increased rates of acetylene decomposition to carbon.

It will be apparent too that, from the standpoint of process economics, higher reaction pressures are desirable, because with such pressures the desired expansion through power nozzles may be accomplished while maintaining proportionally higher pressures in the emerging jets. The less the discharge pressure of these jets is below atmospheric, of course the less the power required ultimately to return the product gases to a pressure at or above atmospheric.

As has been explained, the absolute rate of decomposition of acetylene to carbon is increased by both increased temperature and pressure. As a consequence, it is necessary, in order to take advantage of the benefits of higher temperatures and pressures, to quickly quench the reacting system at the proper time to a lower temperature at which all the reaction rates involved are relatively slow, at the same time lowering its pressure to one at which the reaction rates are also relatively slow. My new method for effecting a stabilization quench is ideally suited for accomplishing this.

It will be apparent that for any given temperature-pressure conditions, a particular time must be allowed for reaction, before the reacting system is quenched, and that when, after the time allowed, optimum concentrations are reached, it is desirable to apply the quench immediately. With my new method of stabilization quench, it is possible to not only quench rapidly, but also at the exact instant desired.

Another feature of my new process for the manufacture of acetylene is its relatively low consumption of both oxygen and methane. I have found that this may be accomplished by pre-heating the reactant oxygen and methane to the maximum degree possible. The pre-heat temperature for the oxygen is restricted only by the operating temperature limits for the practical, continuous life of the pre-heater; in the case of the methane the desirable pre-heat temperature is defined as that to which the methane can be heated without substantial cracking in the pre-heater. At the present time the limiting temperature for pre-heat operation confines the oxygen pre-heat temperature to about 1350° C. The pre-heat temperature for methane is limited by the threshold temperature for methane pyrolysis, which is somewhere between 700° C. and 800° C., depending on the preheat pressure.

The saving of methane results from the fact that under reaction conditions a large fraction of the methane oxidized to supply heat, reacts to form carbon monoxide rather than carbon dioxide, while if heating is accomplished by burning methane as fuel in the pre-heaters, it may be oxidized substantially completely to $CO_2$, with a correspondingly greater production of heat.

The saving of oxygen made possible by pre-heating arises from the fact that air may be used for pre-heater operations, which makes it possible to introduce much less oxygen into the reaction chamber in order to produce a desired reaction temperature than would otherwise be required.

Another advantage of reactant pre-heating is that less heating need be done in the reaction chamber, so that the methane fraction oxidized and the oxygen necessary for this reaction occupy a smaller fraction of the total volume of reactant gases, and consequently the products of combustion form a smaller fraction of the overall reaction products, which, of course, makes recovery of acetylene easier.

Another feature of my new process for synthesis of acetylene is that the reactant gases are brought into contact with each other in a suitable mixer, at the mouth of the reaction chamber, at such high temperatures of pre-heat that thermal auto-ignition of the combustion reactions, which liberate a further amount of heat for the purpose of cracking the unoxidized fraction of the hydrocarbon, is immediately effected. In contrast, in the prior art Sachsse process the pre-heated reactants were required to be mixed without ignition and were thereupon subjected to pyrolytic combustion in a free adiabatic flame. Even if pure methane were used, this limited the pre-heat temperature of the mixed ingredients to about 600° C. As a practical matter, the reactant hydrocarbon always contains small quantities of higher paraffins and olefins, such as ethane, butane, and ethylene, which oxidize at lower temperatures than methane. In the prior art processes for acetylene synthesis it would thus have been impossible to employ the high degrees of pre-heat that are a feature of my novel process.

It will be apparent, however, that although it is preferable to pre-heat the reactants to such a degree that when they are brought together auto-ignition occurs, my new process for expansion quench may be used with good results even though the reactants are pre-heated to such a lesser extent that auto-ignition does not take place when they are mixed, but rather the mixed reactants are ignited to pyrolytic combustion by an external source, as in the Sachsse process.

It will thus be seen that my new process for synthesis of acetylene has a number of advantages. Through employing my new method for stabilization quench, the reacting mixture is stabilized more rapidly and more nearly at the optimum instant than has heretofore been possible. In addition, my process requires less methane, or other hydrocarbon, and oxygen and produces a product richer in acetylene than previous processes, owing to my new provision for maximum preheats. Further, in my new process synthesis is carried out at higher, and therefore more efficient temperatures than have hitherto been possible. Finally, in my new process power that has heretofore been wasted is recovered in the turbine used for stabilization quench.

Certain features, advantages, and theoretical considerations involved in the practice of my new process for synthesizing acetylene, having now been explained, the steps involved in the process may be described in a general way, together with equipment, some of which is novel, suitable for use in practising the process.

For purposes of illustrating my invention, it may be assumed that oxygen and methane are desired to be used as reactants. Air may be used as a reactant rather than pure oxygen, and for purposes of my new process is its equivalent. Similarly, naturally occurring gases which contain methane may be used rather than pure methane, and are equivalents thereof in my new process for the synthesis of acetylene. The particular temperature and pressure at which the reaction is conducted is not a feature of my new process for the synthesis of acetylene. For purposes of illustrating my invention, however, I will employ a reaction temperature of approximately 1577° C. Although the optimum pressure of the reactants at any given temperature and rate of throughput must be, in the last analysis, determined experimentally, it will be assumed, again for purposes of illustration, that the optimum pressure at 1577° C. is 8.0 atm. abs.

In order to synthesize acetylene under these reaction conditions, according to my new process, I proceed in the following manner.

As has been explained, I introduce the reactants separately, under pressure and pre-heated, into the reaction chamber. To minimize work requirements, I compress the reactants before pre-heating them, which means, of course, that the pre-heating operations must be carried out under pressure.

I introduce oxygen into my process at a pressure of 9.0 atm. abs. I may pre-heat this compressed oxygen in a continuous, moving-bed, pebble heater; in cyclic regenerative pebble-stoves or checker-brick recuperators; or possibly in tubular exchangers using Metamic (Cr-bonded $Al_2O_3$) refractory tubes. In order to withstand the corrosive attack of high-temperature, high pressure oxygen the pre-heater used must, of course, utilize refractory oxide materials for heat transfer. It is obvious that the pre-heater used must be capable of withstanding the pressure involved.

The continuous, moving-bed pebble heater is particularly suitable for oxygen pre-heating. In it refractory pebbles are heated by pressurized combustion of fuel gas, which may be methane, in an upper chamber by direct countercurrent flow of the hot products of fuel combustion. The pebbles are cooled in a lower chamber by direct contact with the stream of gas to be heated. The flow in the lower zone is also countercurrent with the gas rising through the continuously descending pebble bed. The cooled pebbles are removed at the bottom through a pebble flow metering mechanism and a gas seal. They are then raised to the upper zone mechanically in an elevator.

While this pebble heater has the disadvantage that gases burned in it to produce heat as well as the air to support the combustion must be compressed to the same pressure as the gas to be heated, which requires added input of work, this disadvantage may be substantially avoided by recovery of power to run the compressors through expansion of the hot, compressed stack gases emerging from the heater through a gas turbine. The power output of this expansion turbine may be regulated through control of the quantity and temperature of gases entering it and of the expansion ratio over the turbine of the gases put through it. Use of this technique makes possible pressurized heating with minimum net power input.

The oxygen is taken from the pre-heater at about 8.9 atm. abs. and 1350° C. and delivered through a refractory-lined, steel-shelled flue and a mixer to the reaction chamber.

I introduce the reactant methane into my process at a pressure of 9.0 atm. abs., and first pre-heat it to a temperature of about 700° C. in a gas-fired radiant furnace. In order to avoid unduly high tube-wall temperatures on the methane side, with consequent coking of the tube walls, the methane stream is put through the furnace rapidly enough so that a pressure drop of at least 0.1 atmosphere occurs therein. The reactant methane, now at 700° C. and 8.9 atm. abs., is then delivered through stainless steel (e. g., of high chrome and low nickel content) high-temperature tubing and a mixer to the reaction chamber.

A suitable ratio of reactant oxygen to reactant methane, in terms of mols, is 1.0:1.92 oxygen:methane. This ratio is suggested on the assumption that the oxygen reactant gas includes 5 volume percent of $N_2$ as an impurity.

To effect fluid mechanical mixing without a permanent loss of a substantial fraction of process pressure I provide for such mixing by allowing the streams of the two gases to impinge upon each other at approximately right angles, with opposed tangential swirling, at the throat of a venturi tube, through which they enter the reaction chamber. One reactant, preferably oxygen, is accelerated to high velocity during its traverse of the venturi convergence and is given a tangential swirl by appropriate fluting on the walls of the feed tube which precedes this convergence. The other reactant, preferably methane, is so ejected at high velocity through small port tubes into the oxygen stream at the venturi throat that the angle of the ejection is in a plane perpendicular to the direction of oxygen flow but that the angle of methane flow in that plane opposes the tangential swirl of the oxygen stream. This new method of mixing is another feature of my invention.

When the gases at these separate temperatures are contacted, thermal auto-ignition of the combustion reactions, which liberate a further amount of heat for the purpose of cracking the unburnt fraction of the methane, is immediately effected. The increase in volume due to oxidation reactions and to the increase in temperature which accompany them assists in the mixing process. However, the principal contribution to successful mixing is effected during the incipiency of the combustion auto-ignition by my fluid mechanical means and by the rapid diffusion produced by the high translational energies of the gas molecules due to their high pre-heat temperatures and elevated pressures.

The acceleration of the two streams is accompanied by a substantial drop in pressure. The pressure, however, is in good measure regained because of the deceleration of the reacting mixture in the venturi divergence and because of the thrust of the gas stream against the power nozzle convergence at the opposite end of the reaction chamber, in which the mass flow is limited by the acoustic critical flow rate through the nozzle throat. In addition, both the heat released by the oxidation of a fraction of the methane and the increase in the number of mols of gas present as the reactions progress tend to increase substantially the volume of the gases in the reaction chamber. This tendency, in conjunction with the ram jet effect against the power nozzle convergence, enhances the re-creation of pressure in the reaction chamber.

I may provide for varying the volume of the combustion chamber, or reaction chamber, in accord with the requirement for optimum retention time therein, by providing for independent movement of the mixing venturi with respect to the combustion chamber, so that the former may move into or out of the latter in a controlled manner.

At the proper instant, i. e., at the end of the desired retention time, the reaction mixture is brought out of the reaction chamber through a converging-diverging power nozzle, which converts a substantial portion of the thermal energy of the reaction gases into kinetic energy of unidirectional translation, and so effects a quench, in the manner already described. I may use a nozzle having an expansion ratio of 20:1. In passing through this nozzle the reaction products, which are at about 1577° C. and 8.0 atm. abs., will be cooled to about 812° C. during the expansion to 0.4 atm. abs. pressure, and will then be discharged in a jet having a velocity of about 6960 feet per second. This jet I use to drive an impulse turbine, in order to convert the kinetic energy of the jet into mechanical work before it is reconverted, by loss of speed, into heat energy.

Although I have for purposes of simplicity referred to a single venturi mixer, reaction chamber, and power nozzle, actually I employ a multiplicity of sets of mixers, reaction chambers, and power nozzles, so arranged that the various power nozzles discharge against the blades of the impulse turbine rotor at various points around its periphery. I may use the turbine to drive an electric generator, or may otherwise make use of the work that it produces.

As the reaction mixture, which has been reheated to about 1000° C. by fluid frictional and other irreversible effects, emerges from the turbine, it is quenched by water sprays which may be banked in the turbine casing immediately beyond the turbine discharge. The gases are then at a temperature of about 146° F., and a pressure of about 0.39 atm. abs.

I may then pass the gases up through a vertical tower packed, for example, with Raschig rings, through which cool water descends. The gases are cooled by direct contact with this water to about 105° F., and the major portion of their water content is condensed. If the water so used has been cooled in a cooling tower, it should be deaerated to prevent excessive contamination of the synthesis gas by oxygen. The synthesis gas leaves the tower at about 105° F. and 0.36 atm. abs.

I may then pass the synthesis gas through Pease-Anthony venturi scrubbers, to remove remaining fine carbonaceous dust, and then pass it through wet cyclones packed in their upper sections to remove entrained water spray.

My clean synthesis gas then emerges. It has a temperature and pressure of about 105° F. and 0.30 atm. abs., and has approximately the following composition, on a dry volume basis:

| | Percent |
|---|---|
| Acetylene ($C_2H_2$) | 11.8 |
| Methane ($CH_4$) | 5.9 |
| Nitrogen ($N_2$) | 1.5 |
| Carbon dioxide ($CO_2$) | 2.8 |
| Carbon monoxide ($CO$) | 21.7 |
| Hydrogen ($H_2$) | 56.3 |
| | 100.0 |

Because the gas is saturated with water vapor at 105° F. and 0.30 atm. abs., it contains about 23.5% water vapor on the wet volumetric basis. It also contains small amounts of diacetylene and higher acetylenic homologs, perhaps as much as 0.5% of the dry synthesis gas volume.

This clean synthesis gas may now be sent through an acetylene recovery system, which system forms no part of my present invention.

In addition to my new method of stabilization quench and my new method for synthesis of acetylene, I have developed certain new equipment suitable for use in practicing my new processes. Specifically, I have invented a novel turbine suitable for use in practicing my new expansion quench. I have also invented a novel reactor, in which the reactants may be brought together, the reaction completed, and the quench according to my new method completed. I have also invented a novel mixer capable of high speed mixing of the reactants without moving parts, prior to their entrance into the reaction chamber proper. I have also invented a new apparatus for controllably varying the length of the reaction chamber, and thereby varying the retention time of the reacting mixture in the reaction chamber.

In my new turbine the rotor and stator blades are so constructed, and such provision is made for cooling both the blades and the main body of the rotor, that my turbine is capable of withstanding temperatures greater than those sustainable by available turbines.

In my reactor, means for bringing together hot oxygen and a hot hydrocarbon in a mixer, a chamber in which the mixture may undergo chemical reaction, a converging-diverging power nozzle suitable for converting heat energy to kinetic energy, an impulse turbine capable of stabilizing the jet, and water sprays capable of further cooling the stabilized reaction ingredients are all integrated in a novel and useful unitary structure.

In my new mixer a conduit, fluted internally in such a manner that a gas passing through it is given a clockwise or counterclockwise rotational swirl, is fitted into the converging end of a venturi. Into the throat of the venturi opens a multiplicity of smaller, unfluted conduits, the axes of which all lie in a plane perpendicular to the longitudinal axes of the venturi. These conduits are placed at such an angle (to the venturi throat radii which may be throught of as touching the centers of the respective openings) that gas entering the venturi throat through them is given a swirl therein opposite in rotational direction of that given the gas which enters through the fluted conduit. These smaller conduits may desirably be tapered so that their diameter decreases toward the openings, or ports, in the venturi throat.

In my new apparatus for controllably varying the length of the reaction chamber, I have provided a combustion chamber into which my mixer fits telescopically, and means for controllably moving the divergence, or diffuser, end of my venturi mixer, for example, more or less deeply into the reaction chamber. The effect is that the length of the reaction chamber, which governs the retention time of the reacting gases passing through the chamber, may be varied controllably within predesigned limits.

My novel process and apparatus may be further described with reference to the appended drawings, wherein.

Figure 1:
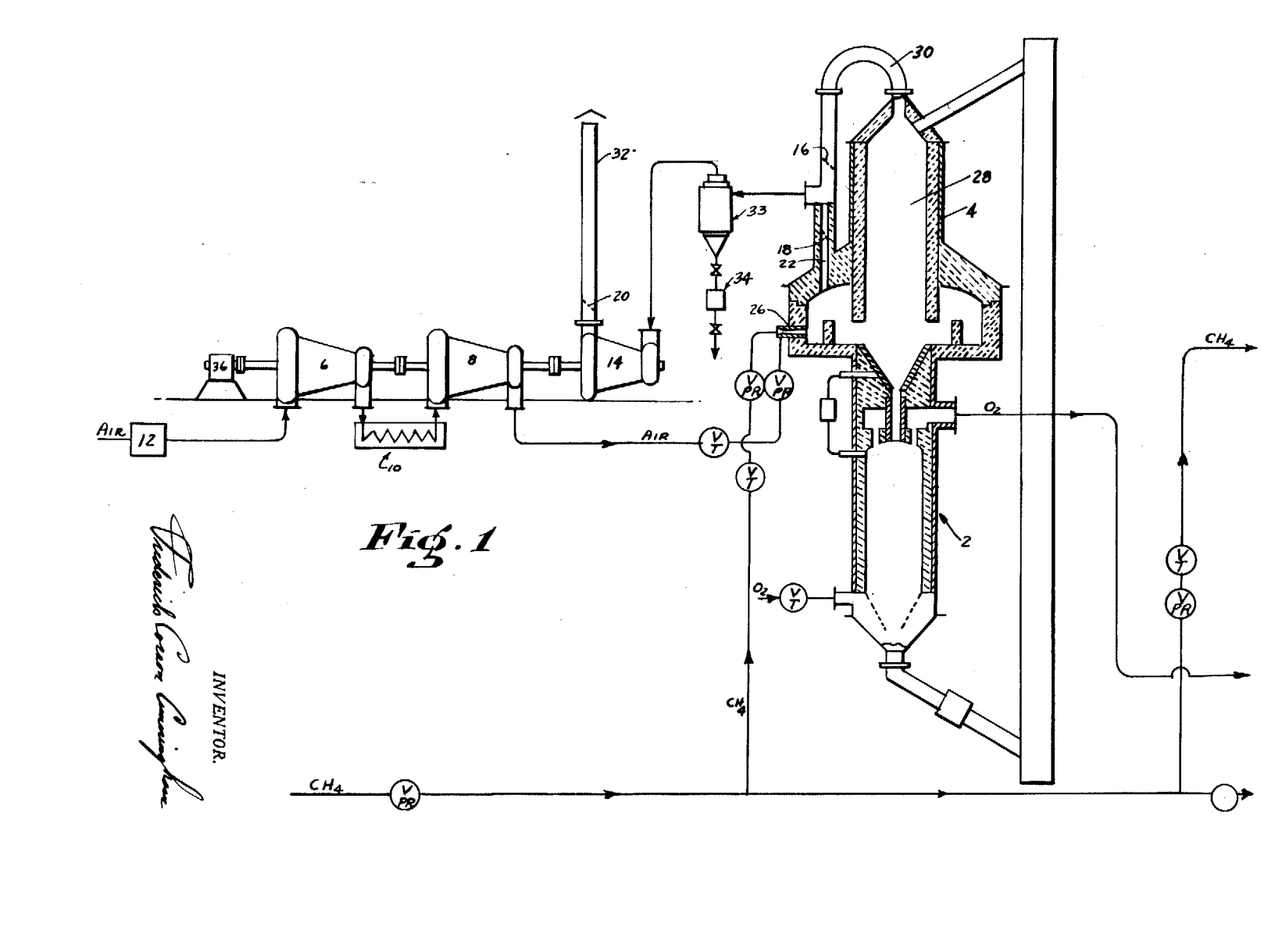
Fig. 1 is a diagrammatic flow sheet of the process for the synthesis of acetylene.
Figure 1A:
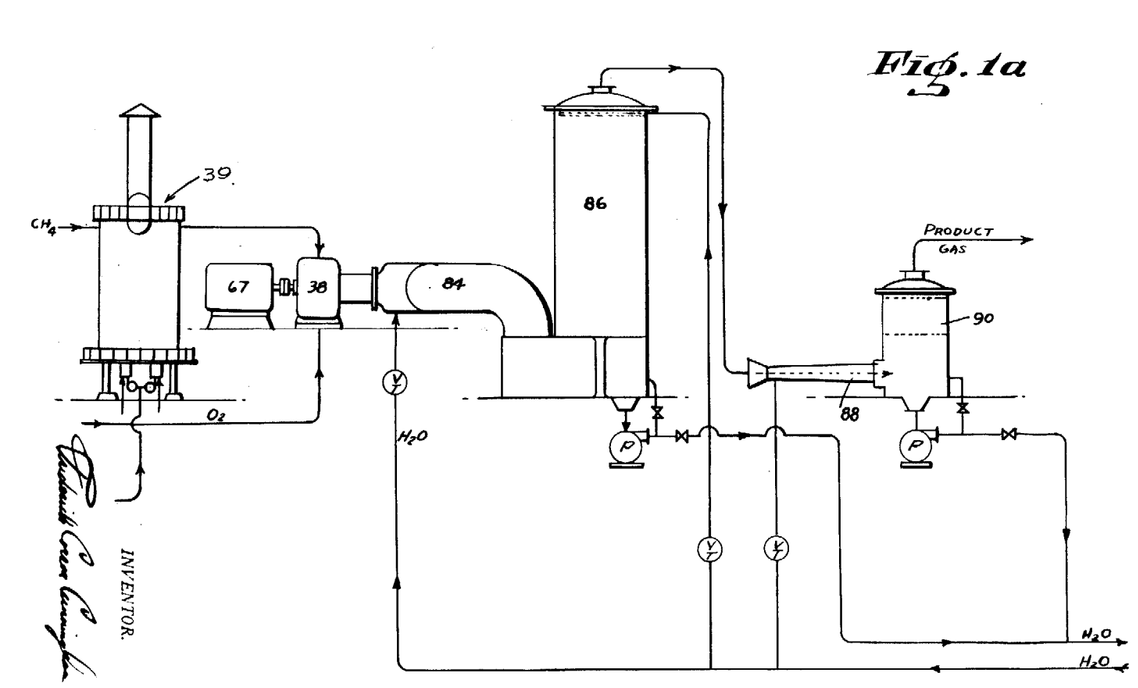

Referring to Fig. 1 of the drawings, oxygen at 9.0 atm. abs. enters the bottom of a pebble heater 2 preferably of the continuous, moving-bed type such as made by The Babcock and Wilcox Co. This pebble heater is built with a steel shell capable of withstanding the optimum pressure required by the process. In it the oxygen is heated by a continuously descending bed of hot refractory pebbles. These pebbles are heated to about 1400° C. by the pressurized combustion of fuel gas, which may be methane, in the upper bed 4 of the heater 2. The fuel gas is delivered to the upper bed from supply lines at the required pressure, 8.9 atm. abs. Air for combustion in the upper bed is compressed to 8.9 atm. abs. by centrifugal compressors 6 and 8, in two stages, with inter-cooling in heat exchanger 10. The air is passed through a filter 12 before entering the first compressor 6.

The power used in driving air compressors 6 and 8 is supplied by expander 14, through which the hot stack gases from the pebble heater 2 are expanded. Control of the power output of said expander may be provided by means of interlocking controls governing dampers 16, 18 and 20 together with suitable automatic valves and pressure and temperature regulating devices. These controls permit the power output of the expander 14 to balance at all times, except during starting-up operations, the power demand of the compressors 6 and 8. Instead of by-pass 22 and damper 18, an auxiliary flame and combusion system may serve the same purpose of controlling the temperature and mass of the stack gas stream entering the expander 14.

Methane and air, both compressed as described, enter the combustion tuyeres 26 in the upper bed of the pebble heater 2. The methane burns in the air, and the heated gases rise through the descending pebble bed 28 and leave the heater 2 through stack 30. After going through an electrostatic pebble dust precipitator 33 the stack gases enter and are expanded through the expander 14. The mass of stack gases which pass from the combusion tuyeres 26 up through the pebble bed 28 is controlled by the damper 16 in the stack 30. The temperature of the gases entering the expander and to a lesser extent their mass may be controlled by means of by-pass 22 and damper 18, which permit by-passing the upper pebble bed with the very hot tuyere gas. The stack gases leave the pebble heater 2 at about 8.63 atm. abs. and 400° C. The hot tuyere gas has a temperature of more than 1400° C. The pressure range over which the gases are expanded is controlled by damper 20 in the expander exhaust line 32. In this particular case the expansion is carried out from about 8.63 atm. abs. to the ambient pressure. Under these conditions the mass, temperature and pressure of the stack gases is such that the power output of the expander essentially balances the power consumption of the air compressors so that damper 18 remains nearly closed. The electrostatic pebble dust precipitator 33 empties through dust blow-down box 34.

The air compressors 6 and 8 are started by means of electric motor 36.

The oxygen stream leaves the pebble heater at about 8.9 atm. abs. and 1350° C. and is delivered to the reactor 38 through a refractory-lined, steel-shelled flue, not shown. It may be desirable, to use accordion-folded expansion joints in the flue, which should be made of heat resistant alloy steel. Primary protection of the joint may be achieved by using telescoped ceramic sleeves and filling the space between the sleeves and the metal joint with cooler N₂ at a pressure balancing that of the hot O₂. Refractory wool may also be packed into these void spaces.

Reactant methane enters the gas-fired radiant furnace 39 at 9.0 atm. abs., and emerges from it at about 8.9 atm. abs. and 700° C. It is then delivered through as short (in order to minimize coking at the walls) a length of high temperature steel alloy tubing (not shown) as is practical to the reactor 38.

Figure 2:
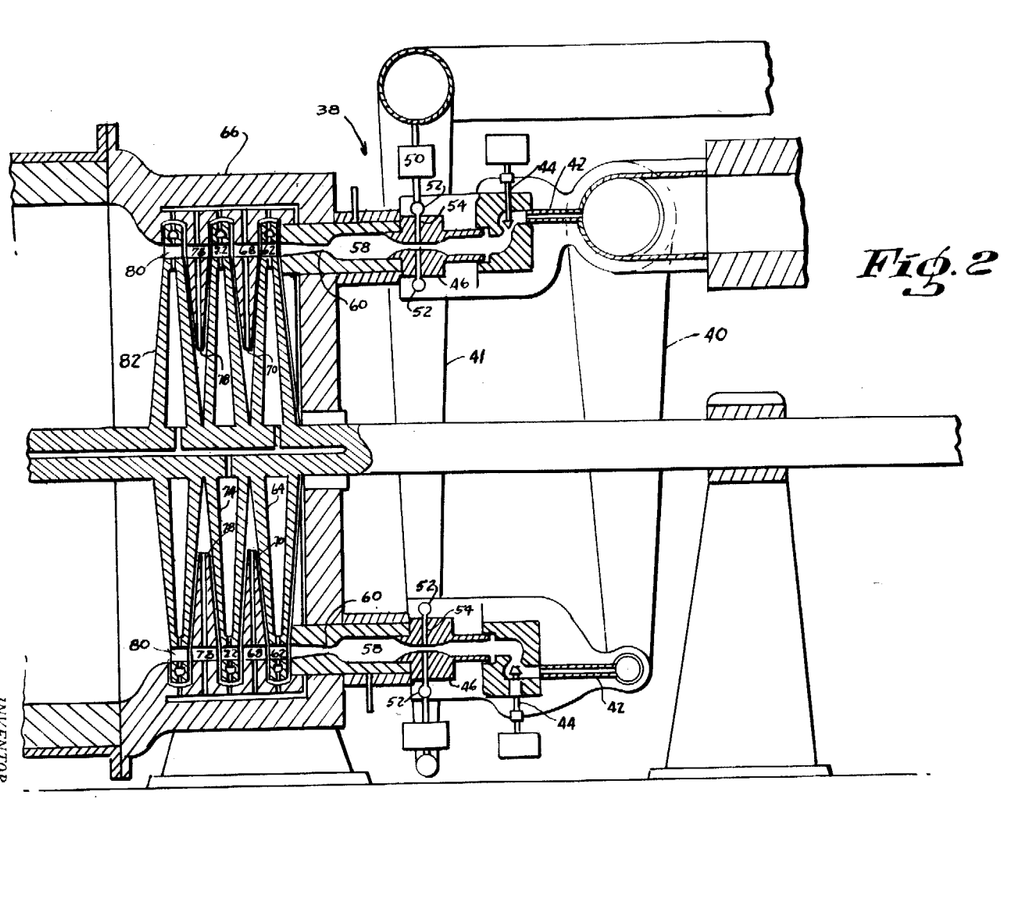
Fig. 2 is a diagrammatic view of a suggested embodiment of my new reactor.

The pre-heated reactant oxygen and methane are delivered respectively to separate intake manifolds 40 and 41 within the reactor 38, as shown in Fig. 2, from which the multiplicity of combustion systems are fed through the venturi mixers 46.

The oxygen manifold 40 may be constructed of retaining steel shells lined with a suitable refractory material, such as zirconia (ZrO₂). The refractory may be made in telescoping segments mounted so that they may move independently of the steel retaining shells, in order to prevent undue stresses thereon owing to expansion and contraction. The reduction in cross-sectional area for each successive telescoping segment may desirably be determined by the amount of flow needed at any given point along the manifold in order to provide the desired supply of oxygen to the combustion systems yet to be fed.

It may be desirable to provide a pressure-balancing supply of cooler nitrogen or inert gas in the voids between the steel flue and refractory segments, in the manner already described.

The methane manifold 41 may be constructed of a heat resistant steel alloy.

The oxygen then passes through the refractory tubes 42, past the refractory, individual combustion system oxygen control valves 44, into the converging side of the venturi mixers 46.

Methane passes from the manifold 41 through the flow control valves 50 into the small, individual combustion system manifolds 52. It then passes through the conduits 54 into the throats 56 of the venturi mixers 46, and is thereupon mixed with oxygen entering through the converging sides of the venturi mixers 46.

The reactions begin immediately by auto-ignition, and continue as the mixtures pass through the reaction chambers 58.

The divergence ends of the venturi mixers 46 are telescopically fitted within the entrances to the reaction chambers 58, and the venturi mixers 46 are so mounted, by means not shown, that said venturi mixers may be controllably moved varying distances into or out of said reaction chambers 58 so that the length of time during which the reacting gases are retained in the reaction chamber may be varied as desired and so that the reacting gases may be quenched at the optimum moment.

The surfaces along which the venturi mixer 46 is in contact with the reaction chamber 58 should of course be made so as to provide as close a fit as is consistent with movement without binding, and the space between the surfaces should be pressure-sealed so as to insure that none of the reaction gases flow into that space. Steam may desirably be used to accomplish this pressure-sealing, and should be injected continuously into the reaction chamber 58 through the space between the venturi mixer 46 and the reaction chamber 58. This steam efflux has several desirable effects in addition to providing a positive seal against leak of reaction gases. It reacts with carbon produced in the reaction, and so prevents clogging of the space between the venturi mixer 46 and the reaction chamber 58 by a build-up of carbon. Because the entering film of steam tends to remain near the walls of the reaction chamber 58 and the converging-diverging nozzles 60 as it passes through them, it tends to prevent carbon accumulations on those walls as well. If injected at sufficient rates, the steam of film may also form an insulating barrier between the reaction gases and the walls of the reaction chamber.

The mixtures emerge from the reaction chambers 58 through the converging-diverging nozzles 60, which may be constructed integrally with the reaction chambers 58. The nozzles 60 may desirably have an expansion ratio of 20:1. The reacting mixtures enter the nozzles 60 at about 1577° C. and 8.0 atm. abs., and emerge at about 812° C. and 0.4 atm. abs., in a jet having a velocity of about 6960 feet per second.

These jets impinge at various points around its periphery against the blades 62 of the rotor 64 of the impulse turbine 66, and the kinetic energy of the jets is therein converted to mechanical work, which may be used to drive electric generator 67, or as desired.

The impulse turbine may be provided with more than one stage. For example, as shown in Fig. 2, impulse turbine 66 is provided with three stages. In this case the gases being expanded in the turbine pass from the blades 62 of the first rotor 64 onto the guides 68 of the first stator 70, which direct them onto the blades 72 of the second rotor 74; from there they pass to the guides 76 of the second stator 78 and are thereby directed onto the blades 80 of the third and final rotor 82, all in the usual manner.

The gases emerge from the final stage of the impulse turbine at about 1000° C., the increase in temperature resulting from fluid friction and other irreversible effects in the turbine 66, and 0.4 atm. abs. They are immediately cooled by water sprays banked in the casing 84, as is indicated in Fig. 1, to 146° F., the dew point of the system at 0.4 atm. abs.

The gases may then be passed through the packed vertical tower 86 against descending cooling water, and thus be cooled by direct contact to 105° F. They emerge from the tower at about 0.36 atm. abs. with much of their water vapor content removed by condensation, i. e., the water condensed represents the difference in water vapor content between gas saturated at 146° F. and 0.4 atm. abs. and gas saturated at 105° F. and 0.36 atm. abs.

The gas may then be passed through the Pease-Anthony venturi scrubber 88, to remove remaining fine carbonaceous dust, and through the wet cyclone 90 packed in its upper section to remove entrained water spray. Clean synthesis gas, of the composition already described, emerges.

Figure 3:
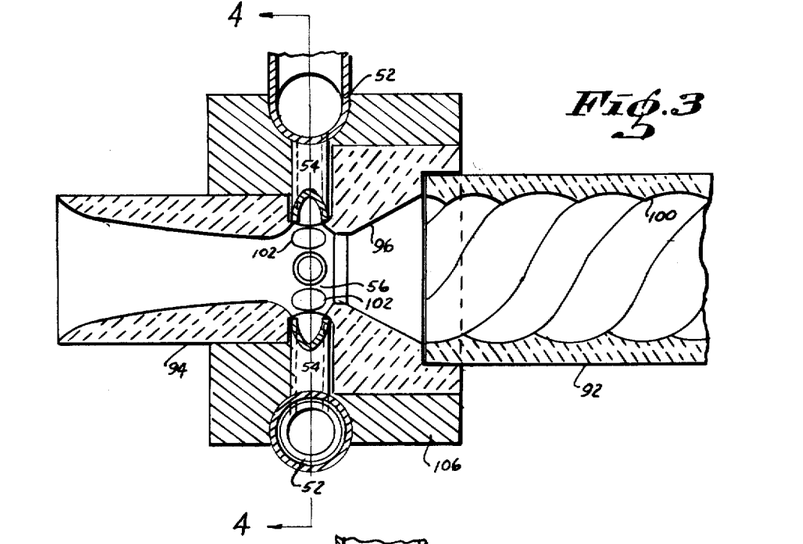
Fig. 3 is a side view of my new venturi mixer.
Figure 4:
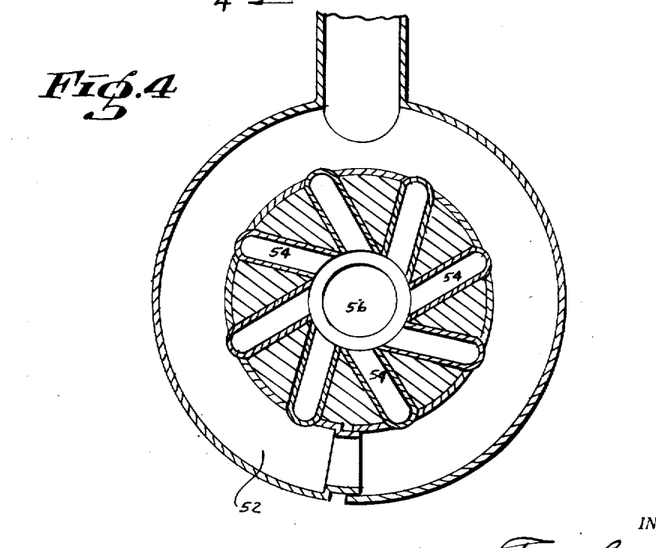
Fig. 4 is a cross-sectional view of my venturi mixer, at 4—4 in Fig. 3.

A suggested form of my new venturi mixer is shown in greater detail in Figs. 3 and 4. As is shown, the mixer may be constructed in two parts, the feed tube 92, through which oxygen is introduced in my new process for synthesizing acetylene, and the venturi proper 94. The interior of the feed tube 92 is provided with flutings 100, as shown, to induce rotational swirl. Both the feed tube 92 and the venturi 94 may be made of oxide ceramic refractories in order to withstand the corrosive effect of hot oxygen. The feed tube 92 introduces the gas passing through it at the convergence end 96 of the venturi 94.

The other gas, methane, in my process for the synthesis of acetylene, is introduced through the individual manifold 52 and the conduits 54 into the throat 56 of the venturi. As more clearly appears in Fig. 4, the conduits 54 are placed so that this gas enters the throat 56 through the ports 102 at such an angle tangentially to the diameter of the throat 56 that a rotational swirl opposite to that produced in the gas passing through feed tube 92 results.

In consequence, my new venturi mixer produces rapid mixing without use of any moving parts.

As is shown in Fig. 3, the conduits 54 and manifolds 52 may be secured in relation to the venturi mixer 46 by means of refractory cement 106, such as zirconia.

Figure 5:
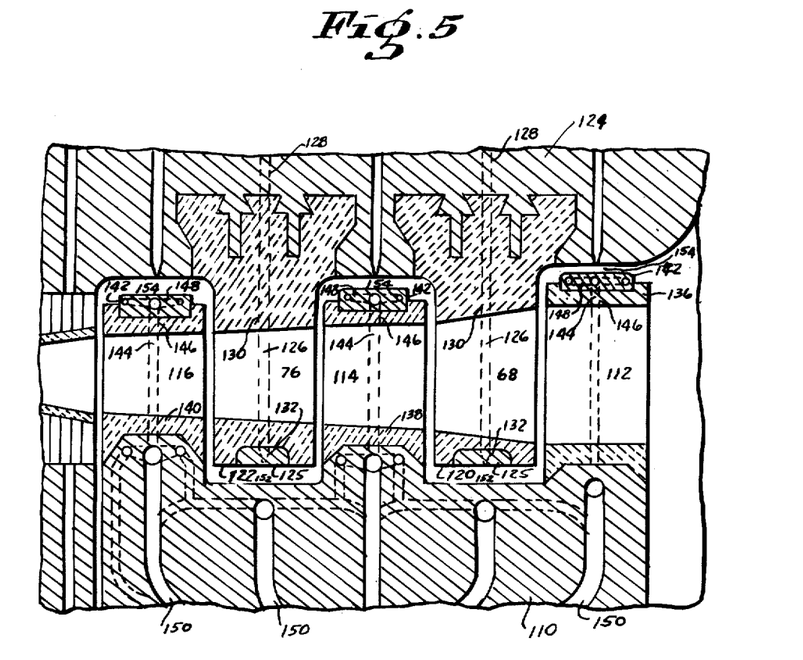
Fig. 5 is a fragmentary diagrammatic view of a portion of a suggested turbine, together with suggested means for circulation of cooling fluid internally within the blades of my impulse turbine rotor and stators.

In Fig. 5 is shown diagrammatically a suggested arrangement for the blades 112, 114 and 116 of the rotor 110 and the guides 68 and 76 of the stators 70 and 78, and a suggested system for internal circulation of fluid to cool said blades and guides. As appears from Fig. 5, a single rotor wtih three sets of blades may be used rather than three rotors, as shown in Fig. 2, and the single rotor may be preferable.

The stators 70 and 78 are made up of a multiplicity of stator elements 120 and 122, which are made of an oxide ceramic and mounted respectively at various points around the peripheries of two annular circles within the housing 124 of the turbine. The guides 68 and 76 of the stators 70 and 78 are made integrally with the stator elements 120 and 122, of the same oxide ceramic. The two circularly disposed groups of stator elements 120 and 122 are retained by two rings 125, each of which is concentric with the inside diameter of the housing 124. The stator elements 120 and 122 are held against circular motion by alloy steel tubes 126, which are anchored in holes 128 in the housing 124, through which they pass, and which pass also through holes 130 in the stator elements 120 and 122 and holes 132 in rings 125.

The rotor 110 is provided with blades 112, 114, and 116 which are made integrally with the rotor blade elements 136, 138 and 140 of an oxide ceramic and mounted at various points around the periphery of said rotor. They are retained by rings 142, which are concentric with the rotor 110, and by the alloy steel tubes 144, which are firmly secured in the rotor 110 and which pass through holes 146 in the turbine, blade elements 136, 138 and 140 into the rings 142, which are provided with hollowed out interior portions 148.

Passages 150 extend through the body of the rotor 110 from a manifold in the turbine shaft, not shown. Cooling fluid, which may be, for example, mercury, liquid sodium, water, or silicone oil, is introduced through the passages 150 into the tubes 144 and through them into the hollowed out portions 148 of the rings 142. As the liquid is vaporized in cooling the hot surfaces with which it thus comes into contact, the vapor is forced back out through the passages through which the liquid entered, by the centrifugal effect of the whirling rotor 110 on the new liquid cooling fluid. The vapor is removed from the rotor, after passing through passages 150, through a manifold in the turbine shaft, not shown, recondensed, and recirculated.

The stator guides are cooled by introducing steam or water through the tubes 126, which pass through the stator elements 120 and 122 and the rings 125. If water is used it is vaporized in the hot spaces 152 between the stator elements 120 and 122 and the rotor 110, and passes out between said stator elements and the rotor elements 136, 138, and 140 into the reaction gases passing through the turbine.

It will thus be seen that I have provided a new and effective means of so cooling the rotor blades and stator guides of turbines that they may be suitably used in expanding gas streams at high temperatures.

Instead of cooling my rotor blades in the manner just described I may provide orifices from the hollowed out portions 148 of the rings 142, and allow cooling liquid entering in the manner already described to be thrown from these orifices by the centrifugal force of the whirling rotor 110. When the gases being expanded through the turbine are acetylene synthesis products, the cooling fluid should be water. The water should be ejected at a rate such that it is converted to steam in the hot free spaces 154 before any of it may pass into the reaction gas stream. The major fraction of the steam so formed is removed through passages 156 which may be provided in the housing 124 of the turbine.

Figure 6:
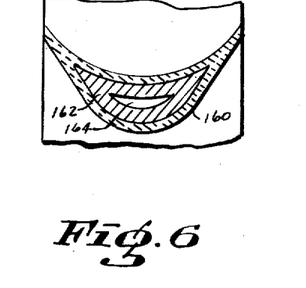
Fig. 6 is a cross-sectional view of a suggested form of blades for the turbine rotor and stators.

Fig. 6 is a cross-section of a suggested new form of rotor blade suitable for use in a turbine capable of expanding gases at high temperatures.

A jacket 160 of ceramic material is fitted over a core 162, and secured in position by any suitable means. This core is constructed with sufficient strength to sustain the high tensile stresses that result from centrifugal force, and is made of heat resistant steel. Inside the core 162 is an open space 164, suitable for connection with a cooling system of the coolant recirculation type already described.

Another suggested new form of rotor blade, made entirely of ceramic, has already been described.

A third new form of rotor blade which may be desirable is similar in structure to the core 162 shown in Fig. 6. That is, the blade is constructed of heat-resistant steel and may be provided with one or more open spaces 164, designed so that maximum cooling may be effected in the blade by means of a coolant recirculation system such as that already described, but without undue sacrifice of strength against tensile stresses.

I claim:

1. The method of synthesizing acetylene which comprises separately compressing oxygen undiluted by products of combustion and a gaseous reactant hydrocarbon, separately preheating said oxygen and said reactant hydrocarbon to temperatures such that when they are mixed reaction will take place by autoignition, rapidly mixing said oxygen and said hydrocarbon in a venturi by rapidly introducing one of said materials in a rotationally swirling manner into the converging side of said venturi and rapidly introducing the other of said materials in an oppositely rotating manner into the throat of said venturi, retaining for a period of time the resultant mixture at the temperatures progressively resulting from the reactions that take place, and rapidly cooling, at a time when the quantity of acetylene present in the reaction mixture is at about a maximum, the products of said reactions by converting a portion of the thermal energy of said products into the kinetic energy of a jet and thereafter driving an impulse turbine with said jet, whereby its kinetic energy is converted into mechanical work.

2. The method of synthesizing acetylene which comprises separately compressing oxygen and methane, separately preheating said oxygen and said methane to temperatures in excess of 600° C., rapidly mixing said oxygen and said methane in a venturi by rapidly introducing said oxygen in a rotationally swirling manner into the converging side of said venturi and rapidly introducing said methane in an oppositely rotating manner into the throat of said venturi, recreating a portion of the pressure lost during acceleration and mixing of the reactants in said venturi, by deceleration of the resultant mixture by means of the diverging end of said venturi and of a ram jet effect against the converging side of a power nozzle, retaining for a period of time said resultant mixture at the reaction temperatures progressively resulting from the reactions that take place, rapidly cooling, at a time when the quantity of acetylene present in the reaction mixture is at about a maximum, the products of said reaction by converting a portion of the thermal energy of said products into the kinetic energy of a jet in a converging-diverging power nozzle, and thereafter driving an impulse turbine with said jet, whereby its kinetic energy is converted into mechanical work, further cooling said products by spraying said products with water, and separating from said products the non-gaseous material included with them.

3. A reactor comprising, a manifold suitable for carrying pre-heated oxygen into a multiplicity of venturi mixers, a multiplicity of valves suitable for regulation of the flow of said oxygen into said venturi mixers, a manifold suitable for carrying pre-heated methane into said venturi mixers, a multiplicity of valves suitable for regulation of the flow of said methane into said venturi mixers, said multiplicity of venturi mixers, a like multiplicity of reaction chambers into which gases mixed in said venturi mixers may emerge, a like multiplicity of converging-diverging nozzles into which the gases passing through said reaction chambers may emerge, said nozzles being so positioned as to allow the jets of gases emerging from said nozzles to impinge on and drive the rotor of an impulse turbine, an impulse turbine suitable to be driven thereby, and means for spraying the gases emerging from said impulse turbine with water.

4. A reactor comprising a manifold suitable for carrying one reactant gas into the convergencies of a multiplicity of venturi mixers, manifolds suitable for carrying a second reactant gas into the throats of said venturi mixers through ports therein, a multiplicity of valves suitable for regulating the flow of said reactant gases into said convergencies and said throats of said venturi mixers, said venturi mixers, a multiplicity of reaction chambers into which gases mixed in said venturi mixers may emerge, said venturi mixers being telescopically and movably fitted within said reaction chambers in such a manner that by moving said venturi mixers the effective internal length of said reaction chambers may be varied, means for controllably moving said venturi mixers within said reaction chambers, means for injecting a pressure-sealing cooler fluid through the junction between said venturi mixers and said reaction chambers into said reaction chambers, a multiplicity of converging-diverging nozzles into which the gases passing through said reaction chambers may emerge, said nozzles being so positioned as to allow the jets of gases emerging from said nozzles to impinge on and drive the rotor of an impulse turbine, and an impulse turbine suitable to be driven thereby.

5. A venturi mixer suitable for rapid mixing of two gases, which comprises a venturi, a conduit leading into the converging side of said venturi, said conduit being internally fluted in such a manner that a gas passing through it is given a rotational swirl, and a multiplicity of passages entering the throat of said venturi through a multiplicity of ports therein, said passages being so positioned that gas entering through said ports will enter said throat in such a direction tangential to the diameter thereof that said gas is given a swirl opposite in rotational direction to that given a gas entering through said conduit.

6. A reactor comprising, a manifold suitable for carrying pre-heated oxygen into a multiplicity of venturi mixers, a multiplicity of valves suitable for regulation of the flow of said oxygen into said venturi mixers, a manifold suitable for carrying pre-heated methane into said venturi mixers, a multiplicity of valves suitable for regulation of the flow of said methane into said venturi mixers, said multiplicity of venturi mixers, a multiplicity of reaction chambers into which gases mixed in said venturi mixers may emerge, a multiplicity of converging-diverging nozzles into which the gases passing through said reaction chambers may emerge, said nozzles being so positioned as to allow the jets of gases emerging from said nozzles to impinge on and drive the rotor of an impulse turbine, an impulse turbine suitable to be driven thereby, and means for spraying the gases emerging from said impulse turbine with water, and in which the conduits through which said oxygen finally enters the converging sides of said venturi mixers are internally fluted in such a manner that the oxygen entering through them is given a rotationally swirling motion, and the conduits through which said methane finally enters the throats of said venturi mixers are so positioned that said methane enters said throats with a swirling motion oppositely rotational in direction from that given said oxygen.

7. A reactor comprising, a manifold suitable for carrying pre-heated oxygen into a multiplicity of venturi mixers, a multiplicity of valves suitable for regulation of the flow of said oxygen into said venturi mixers, a manifold suitable for carrying pre-heated methane into said venturi mixers, a multiplicity of valves suitable for regulation of the flow of said methane into said venturi mixers, said multiplicity of venturi mixers, a multiplicity of reaction chambers into which gases mixed in said venturi mixers may emerge, a multiplicity of converging-diverging nozzles into which the gases passing through said reaction chambers may emerge, said nozzles being so positioned as to allow the jets of gases emerging from said nozzles to impinge on and drive the rotor of an impulse turbine, an impulse turbine suitable to be driven thereby, and means for spraying the gases emerging from said impulse turbine with water, and in which said venturi mixers are telescopically and movably fitted within said reaction chambers in such a manner that by moving said venturi mixers the effective internal length of said reaction chambers may be varied, and in which means are provided for controllably moving said venturi mixers within said reaction chambers, and in which means are provided for injecting steam between said venturi mixers and said reaction chambers into said reaction chambers.

References Cited in the file of this patent

UNITED STATES PATENTS

| Number | Name | Date |
|---|---|---|
| 891,901 | Blieden et al. | June 30, 1908 |
| 1,103,440 | Sellon | July 14, 1914 |
| 1,156,975 | Clark | Oct. 19, 1915 |
| 1,716,130 | Hirshfeld | June 4, 1929 |
| 1,789,004 | Krauel | Jan. 13, 1931 |
| 2,002,565 | Booth | May 28, 1935 |
| 2,010,002 | Holzwarth | Aug. 6, 1935 |
| 2,078,956 | Lysholm | May 4, 1937 |
| 2,195,227 | Sachsse | Mar. 26, 1940 |
| 2,297,446 | Zellbeck et al. | Sept. 29, 1942 |
| 2,321,483 | Haedike | June 8, 1943 |
| 2,343,765 | Garretson | Mar. 7, 1944 |
| 2,377,847 | Allen et al. | June 12, 1945 |
| 2,391,410 | Gerson | Dec. 25, 1945 |
| 2,423,527 | Steinschlaeger | July 8, 1947 |
| 2,497,973 | Bludworth et al. | Feb. 21, 1950 |
| 2,498,444 | Orr | Feb. 21, 1950 |
| 2,520,149 | Keeling | Aug. 29, 1950 |
| 2,563,228 | Ensign | Aug. 7, 1951 |
| 2,572,664 | Robinson | Oct. 23, 1951 |
| 2,630,461 | Sachsse et al. | Mar. 3, 1953 |
| 2,632,689 | Latchum | Mar. 24, 1953 |

UNITED STATES PATENT OFFICE

CERTIFICATE OF CORRECTION

Patent No. 2,805,268 September 3, 1957

Frederick Corson Cunningham

It is hereby certified that error appears in the printed specification of the above numbered patent requiring correction and that the said Letters Patent should read as corrected below.

Column 1, line 71, for "28.5" read -- 25.5 --; column 4, line 61, for "gate" read -- rate --; column 9, line 72, for "throught" read -- thought --; column 10, lines 55 and 56, for "combusion" read -- combustion --; column 11, line 16, after "desirable" strike out the comma; column 13, line 22, for "wtih" read -- with --; column 16, line 52, list of references cited, for the patent number "2,010,002" read -- 2,010,022 --.

Signed and sealed this 12th day of November 1957.

(SEAL)
Attest:

KARL H. AXLINE

Attesting Officer

ROBERT C. WATSON
Commissioner of Patents